US009418364B2

(12) United States Patent
Stridh (10) Patent No.: US 9,418,364 B2
(45) Date of Patent: Aug. 16, 2016

(54) METHOD AND APPARATUS FOR DISTRIBUTED TRANSACTIONS IN A DATA COMMUNICATION NETWORK

(71) Applicant: Telefonaktiebolaget L M Ericsson (publ), Stockholm (SE)

(72) Inventor: Kenny Stridh, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 293 days.

(21) Appl. No.: 14/165,981

(22) Filed: Jan. 28, 2014

(65) Prior Publication Data
US 2015/0120531 A1 Apr. 30, 2015

Related U.S. Application Data (60) Provisional application No. 61/895,737, filed on Oct. 25, 2013.

(51) Int. Cl.
*G06F 15/16* (2006.01)
*G06Q 20/38* (2012.01)
(Continued)

(52) U.S. Cl.
CPC ............... *G06Q 20/38* (2013.01); *G06F 9/466* (2013.01); *G06F 11/1474* (2013.01); *G06Q 20/02* (2013.01); *G06Q 20/0855* (2013.01); *G06Q 20/407* (2013.01); *H04L 67/10* (2013.01)

(58) Field of Classification Search
CPC ........ H04L 67/10; H04L 9/466; H04L 11/747
USPC .................................................. 709/217, 238
See application file for complete search history.

(56) References Cited

U.S. PATENT DOCUMENTS 6,640,244 B1 * 10/2003 Bowman-Amuah .... G06F 9/466
707/999.01
7,206,805 B1 * 4/2007 McLaughlin, Jr. ...... G06F 9/466
707/999.01
(Continued)

OTHER PUBLICATIONS

International Search Report, International Application No. PCT/SE2014/051183 mailed Feb. 5, 2015, 5 pages.
(Continued)

*Primary Examiner* — Kristie Shingles
(74) *Attorney, Agent, or Firm* — Myers Bigel & Sibley, P.A.

(57) ABSTRACT

A method and transaction orchestrator node for executing a global transaction in a transaction execution system. The transaction execution system is involving at least one reliable transaction executing instance supporting a reserve/commit protocol and one unreliable transaction executing instance that does not support a reserve/commit protocol. The transaction orchestrator node is receiving a global transaction initiation message involving plural sub transactions for execution by the involved corresponding transaction executing instances and sending a prepare transaction message to involved reliable transaction executing instances for corresponding sub transactions. Upon receiving confirmation of all prepare transaction messages the transaction orchestrator node is sending an execution message to the involved unreliable transaction executing instance for a corresponding sub transaction. If the execution message is successful the transaction orchestrator node is sending a commit prepared transaction to the involved reliable transaction executing instances for the corresponding sub transactions.

19 Claims, 7 Drawing Sheets (51) Int. Cl.
  *H04L 29/08* (2006.01)
  *G06F 9/46* (2006.01)
  *G06F 11/14* (2006.01)
  *G06Q 20/02* (2012.01)
  *G06Q 20/08* (2012.01)
  *G06Q 20/40* (2012.01)

(56) References Cited

U.S. PATENT DOCUMENTS 7,289,964 B1 * 10/2007 Bowman-Amuah .. G06F 9/5038
  705/1.1
7,290,056 B1 * 10/2007 McLaughlin, Jr. .. H04L 43/0852
  709/201
8,453,163 B2 * 5/2013 Kothamasu ......... H04L 12/5855
  709/238
2013/0110781 A1 5/2013 Golab et al.
2013/0132458 A1 5/2013 Little
2013/0246379 A1 9/2013 Shen et al.

OTHER PUBLICATIONS

Written Opinion of the International Searching Authority, International Application No. PCT/SE2014/051183 mailed Feb. 5, 2015, 6 pages.
Zhao et al: "A Reservation-Based Extended Transaction Protocol" IEEE Transactions on Parallel and Distributed Systems, IEEE Service Center, Los Alamitos, CA, US, vol. 18, N. 2, Feb. 1, 2008, pp. 188-203.
Mullen et al: "Reservation commitment and its use in multidatabase systems", Database and Expert Systems Applications, Springer Berlin Heidelberg, Sep. 6, 1993, pp. 116-121.

* cited by examiner

METHOD AND APPARATUS FOR DISTRIBUTED TRANSACTIONS IN A DATA COMMUNICATION NETWORK

CROSS REFERENCE TO RELATED APPLICATION

This application is claims the benefit of provisional Application No. 61/895,737, filed Oct. 25, 2013, the disclosure and content of which is incorporated by reference herein in its entirety.

TECHNICAL FIELD

The present invention relates to a method and transaction orchestrator node for executing a global transaction in a transaction execution system.

BACKGROUND

Today many systems, for example computer systems of financial institutions are isolated in the sense that, although they are able to communicate with each other via using for example offline batch oriented exchange of transactions files, they are not able communicate online using bidirectional communication protocols.

For this reason, communicating between isolated systems is usually done in a fire and forget manner. In such manner a requester application is able to continue its processing after submitting a request regardless of whether the service providers needed to perform the tasks are immediately available or not. Besides that, the user initiating the request does not have a functional need to wait until the request is fully processed. The service requesters and service providers must have the capability to produce and consume messages at their own pace without directly depending upon each other to be present. However, in practice most messages are sent over unreliable networks and might in worst case be lost.

The problem is that when multiple systems are involved in the same transaction the reliability of the communication becomes more important.

An atomic transaction is a series of operations where either all occur, or nothing occurs. A guarantee of atomicity prevents for example updates to a database occurring only partially, which can cause greater problems than rejecting the whole series outright.

To be able to have an atomic transaction over all involved systems, it's important to trust that messages are correctly received and acted upon. But to complicate the situation even more, each system may also have its own rules for approving or denying a part of the sub transaction.

The impact is that it might be that some of the sub transactions are finished while others are incomplete.

An example is a financial transaction with two different parties, a bank and a power company. The transaction is initiated by a third party. The use case is that a customer wants to buy an electricity voucher from the power company and pay with money from his bank account.

There are two sub transactions involved that must be carried out or not. The first sub transaction is the movement of money in the bank. The second is the issuing of the voucher. The possible errors are that there might not be money on the bank account or the delivery of the voucher fails.

Solutions today are usually implemented as the aforementioned fire and forget pattern where emphasis is laid on the success case, i.e. that all sub transactions are successfully executed.

One example of a computer system using such fire-and-forget pattern is disclosed in WO 2006079001 which describes a system for transferring data related to financial transactions over a public network including a public network, and a plurality of participant computer systems. Each participant computer system is in communication with the public network. Each participating computer system includes one or more applications, and a gateway in communication with the public network. Each application is in communication with a gateway. Each application transmits and receives one or more messages to one or more participant computer systems to perform a function related to a financial transaction. The gateway provides a standard interface for sending and receiving data between applications over the public network.

A problem with the fire and forget pattern is that error cases become complicated to roll back or resolve in other ways. In some cases it becomes even impossible to resolve the correct status if some sub transactions have been successfully executed while some have not.

The outcome is that the global transactions will end up in an undefined state where some parts are committed and some are rolled back. This makes manual clean up necessary. For example, in the financial transaction involving the bank and the power company an error in the issue of voucher would require the reversal of the funds transfer.

SUMMARY

It is an object of the invention to provide a method and a transaction orchestrator node for executing a global transaction.

A first aspect of the invention relates to a method for executing a global transaction performed by a transaction orchestrator node in a transaction execution system. The transaction execution system is involving at least one reliable transaction executing instance supporting a reserve/commit protocol and one unreliable transaction executing instance that does not support a reserve/commit protocol.

The transaction orchestrator node is receiving a global transaction initiation message involving plural sub transactions for execution by the involved corresponding transaction executing instances and sending a prepare transaction message to involved reliable transaction executing instances for corresponding sub transactions.

Upon receiving confirmation of all prepare transaction messages the transaction orchestrator node is sending an execution message to the involved unreliable transaction executing instance for a corresponding sub transaction.

If the execution message is successful the transaction orchestrator node is sending a commit prepared transaction to the involved reliable transaction executing instances for the corresponding sub transactions.

It is an advantage that for a global transaction involving multiple reliable transactions where the order of execution is irrelevant also one unreliable transaction is allowed while still making it possible to orchestrate the global transaction with guaranteed atomicity.

In one embodiment, after receiving, the transaction orchestrator node may be sorting the involved sub transactions for sending the prepare transaction message to involved reliable transaction executing instances before sending the execution message to the involved unreliable transaction executing instance.

In another embodiment, after the step of receiving, the transaction orchestrator node may be registering the global transaction initiation (message) in a storage. This enables the handling of eventual errors automatically. The registering may comprise registering the associated sub transactions. Alternatively, the registering may comprise registering associated sub transactions, one for each transaction executing instance.

In yet another embodiment the transaction orchestrator node may when receiving also be determining, based on the number of involved transaction executing instance, that the global transaction is involving plural sub transactions.

In a further embodiment the prepare transaction message may include a global transaction identity.

In a yet further embodiment, if said execution message is unsuccessful, the transaction orchestrator node may perform a rollback procedure for the involved reliable transaction executing instances for corresponding sub transactions.

In an alternative embodiment, if said prepare transaction message is unsuccessful; the transaction orchestrator node may perform a rollback procedure for the involved reliable transaction executing instances for corresponding sub transactions.

Another aspect of the invention relates to a transaction orchestrator node for executing a global transaction in a transaction execution system involving at least one reliable transaction executing instance supporting a reserve/commit protocol and one unreliable transaction executing instance that does not support a reserve/commit protocol.

The node comprises a processor and a memory which contains instructions that, when executed by the processor, cause the node to receive a global transaction initiation message involving plural sub transactions for execution by the involved corresponding transaction executing instances.

The instructions further cause the node to send a prepare transaction message to involved reliable transaction executing instances for corresponding sub transactions and upon receiving confirmation of all prepare transaction messages send an execution message to the involved unreliable transaction executing instance for a corresponding sub transaction.

The instructions further cause the node to, if said execution message is successful, send a commit prepared transaction to the involved reliable transaction executing instances for the corresponding sub transactions.

In one embodiment the memory further contains instructions that, when executed by the processor, cause the node to: sort the involved sub transactions for sending the prepare transaction message to involved reliable transaction executing instances before sending the execution message to the involved unreliable transaction executing instance.

In another embodiment the memory further contains instructions that, when executed by the processor, cause the node to register the global transaction initiation message in a storage. The associated sub transactions may also be registered. Alternatively, sub transactions may be registered one for each transaction executing instance.

In yet another embodiment the memory further contains instructions that, when executed by the processor, cause the node to determine, based on the number of involved transaction executing instance, that the global transaction is involving plural sub transactions.

In a further embodiment the memory contains instructions that, when executed by the processor, cause the node to include a global transaction identity in the prepare transaction message.

In a yet further embodiment the memory further contains instructions that, when executed by the processor, cause the node to, if said execution message is unsuccessful, perform a rollback procedure for the involved reliable transaction executing instances for corresponding sub transactions.

In an alternative embodiment the memory further contains instructions that, when executed by the processor, cause the node to, if said prepare transaction message is unsuccessful; perform a rollback procedure for the involved reliable transaction executing instances for corresponding sub transactions.

In a further alternative embodiment the storage is a persistent storage. The persistent storage may conform to principles which guarantee that database transactions are processed reliably, such as atomicity, consistency, isolation, durability principles.

A third aspect relates to a computer program product comprising a non-transitory computer readable medium and a computer program stored on the computer readable medium.

The computer program comprises computer readable code means, which when run in a computer being configured as a transaction orchestrator node for executing a global transaction in a transaction execution system involving at least one reliable transaction executing instance supporting a reserve/commit protocol and one unreliable transaction executing instance that does not support a reserve/commit protocol, causes the computer to perform the following:

receiving a global transaction initiation message involving plural sub transactions for execution by the involved corresponding transaction executing instances;

sending a prepare transaction message to involved reliable transaction executing instances for corresponding sub transactions; and upon receiving confirmation of all prepare transaction messages sending an execution message to the involved unreliable transaction executing instance for a corresponding sub transaction;

if said execution message is successful sending a commit prepared transaction to the involved reliable transaction executing instances for the corresponding sub transactions.

Embodiments of the invention will now be described in more detail with reference to the enclosed drawings.

DETAILED DESCRIPTION

The following detailed description of the exemplary embodiments refers to the accompanying drawings. The same reference numbers in different drawings identify the same or similar elements. Also, the following detailed description does not limit the present solution.

Figure 1:
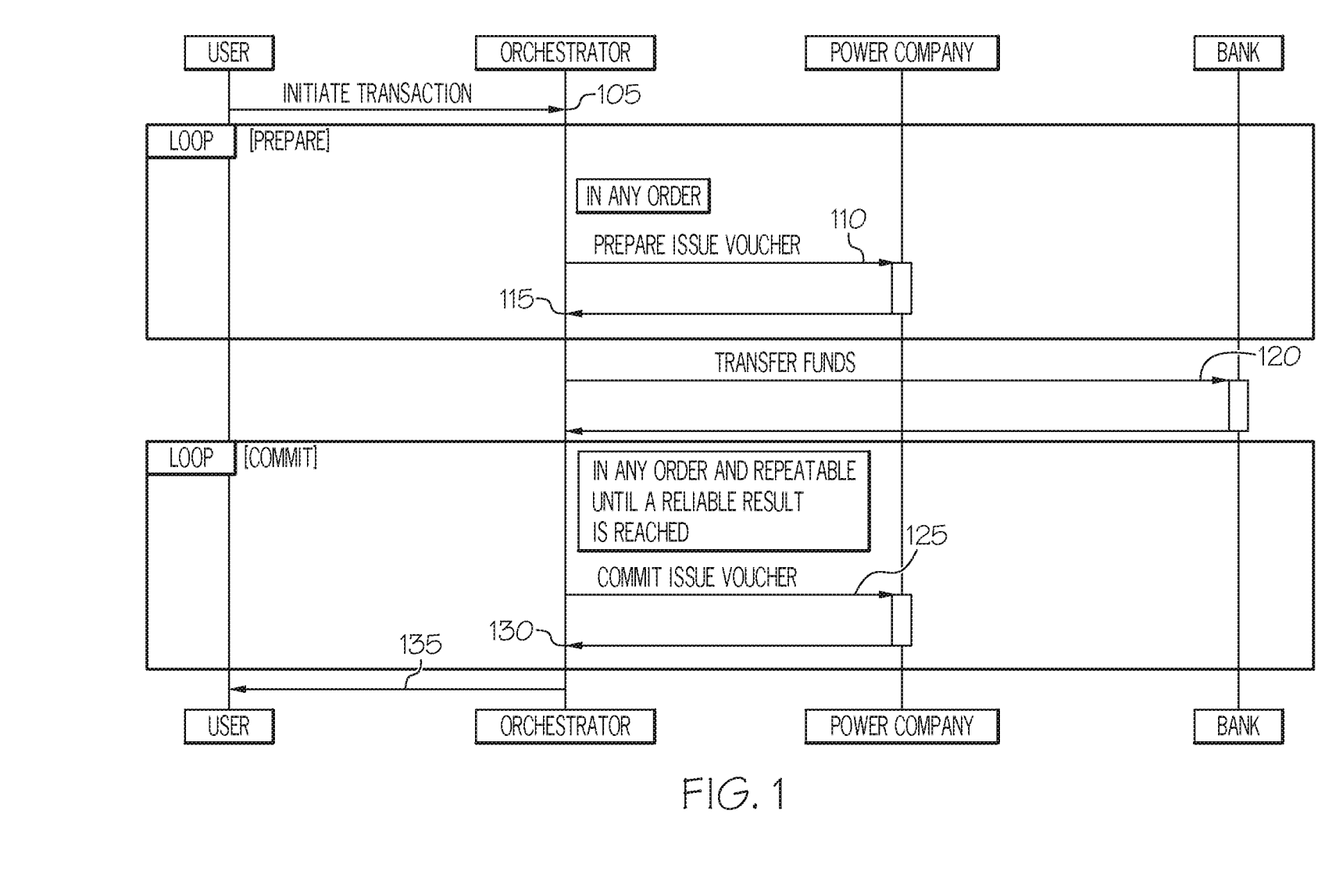
FIG. 1 is a sequence diagram showing an overview of an example embodiment of the invention.

FIG. 1 is a sequence diagram showing an overview of an example embodiment of the invention.

By extending a two-phase reserve-commit sequence to handle unreliable providers as well it is possible to keep the global transaction intact in case of errors. Executing the involved sub transactions in a defined order as shown in FIG. 1 achieves this result.

An example is a transaction with two different parties, a bank connected via an unreliable protocol and a power company connected via a reliable (two-phase reserve-commit) protocol is shown. The possible errors are that there might not be money on the bank account or the delivery of the voucher fails.

The use case is that a customer wants to buy an electricity voucher from the power company and pay with money from his bank account.

There are two sub transactions involved that must be carried out or not. The first sub transaction is the movement of money in the bank. The second is the issuing of the voucher.

The transaction is initiated by a user in step 105 and in step 110 a Prepare Issue Voucher is message is sent from an Orchestrator to the Power Company over the reliable protocol. A confirmation response is received in step 115. In the case of several reliable transactions towards the Power Company or other reliable transaction executing instances are needed the Prepare messaging are looped for these.

Once the reliable transactions are confirmed the unreliable transaction, such as the Transfer Funds message towards the Bank takes place in step 120. The Orchestrator receives a confirmation message in step 125 if the transfer is successful. Provided the unreliable transaction towards the Bank was successful the Orchestrator may now loop over the outstanding Prepare actions by sending Commit message 125 in any order and repeatable until a reliable result is reached by confirmation messages 130. When the Commit phase is finalized, a status message is provided to the User in step 135.

Figure 2:
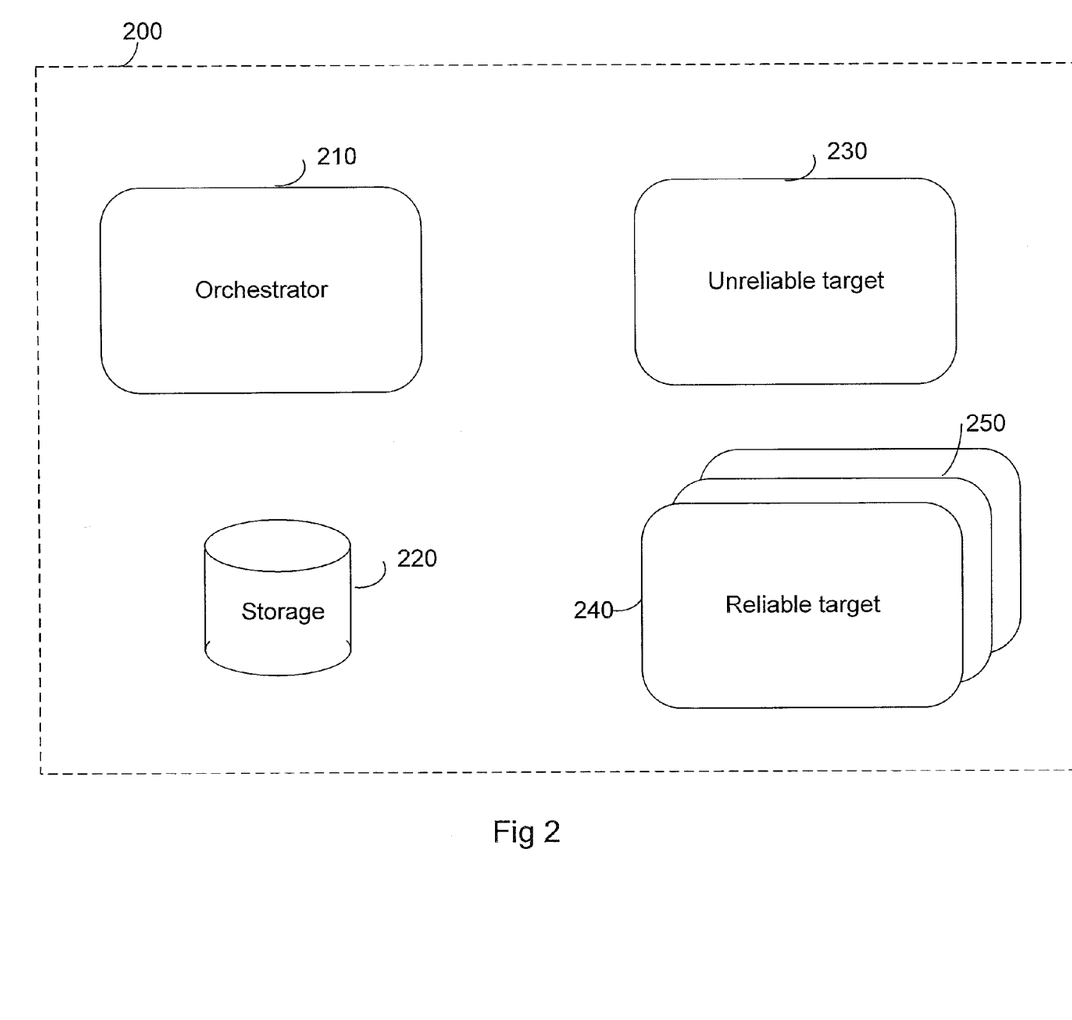
FIG. 2 is a block diagram showing a transaction execution system wherein embodiments may be useful.

FIG. 2 is a block diagram showing a transaction execution system wherein embodiments may be useful.

Involved systems and components include:

An Orchestrator 210 which may be a software process with local persistent storage. The Orchestrator manages the global transaction and communicates with external targets.

A Local persistent storage 220 which may be storage on a hard drive or in a database conforming to the ACID (Atomicity, Consistency, Isolation, Durability) principles. ACID is a set of properties that guarantee that database transactions are processed reliably.

A Reliable external target system 230 which may be a software service that implements reserve/commit functionality. If an external target system responds with success on a reserve request a commit must always be successful. A commit request must always be possible to resend in case of no response scenarios.

An Unreliable external target system 240 which may be a software service that does not implement reserve/commit functionality. In some transaction execution systems, plural unreliable target systems may exist for a particular global transaction, while in others only one unreliable target systems may exist for a particular global transaction.

Figure 3A:
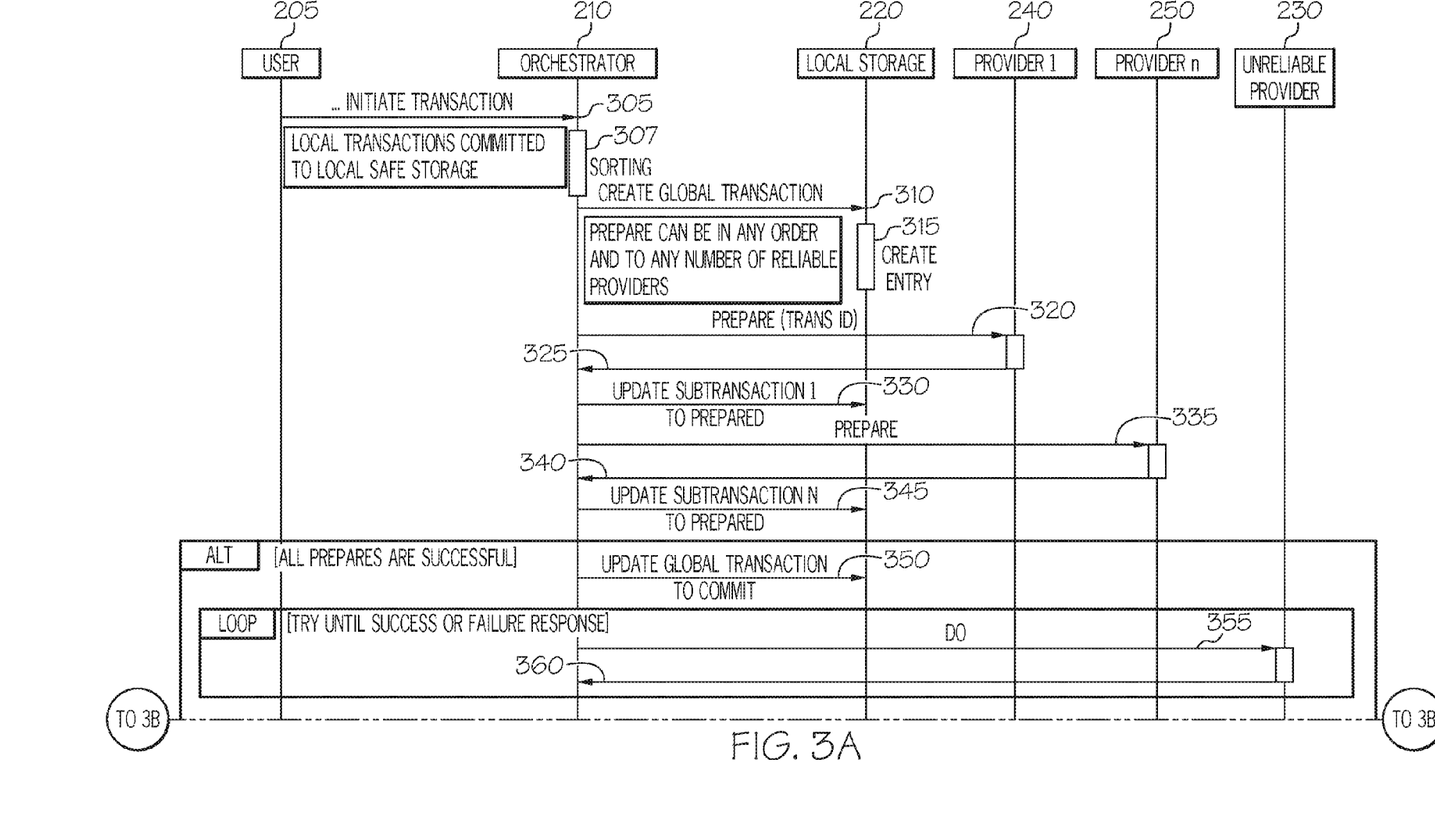
FIG. 3A-C is a sequence diagram showing a more detailed view of a method for executing a global transaction.
Figure 3B:
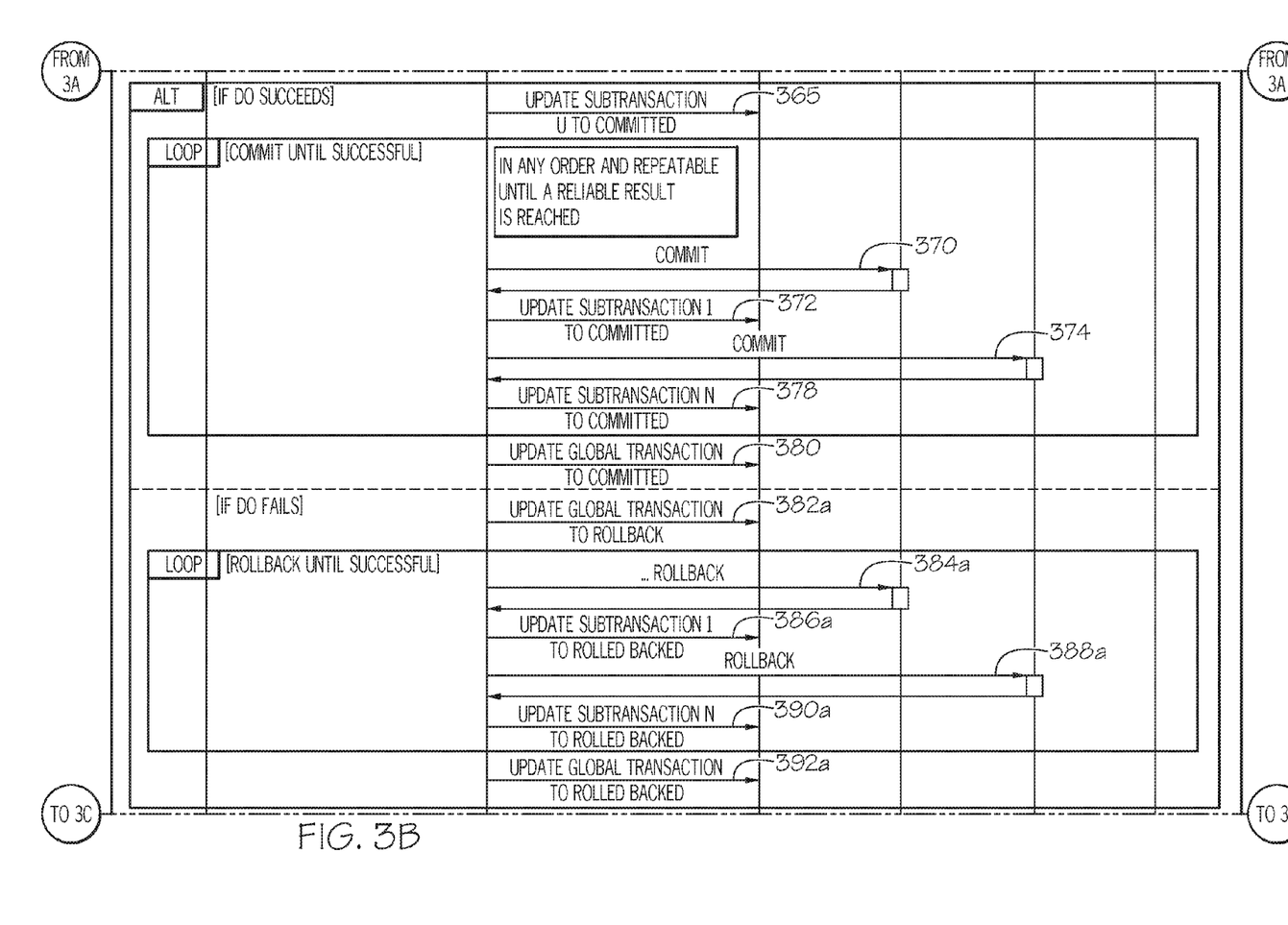
Figure 3C:
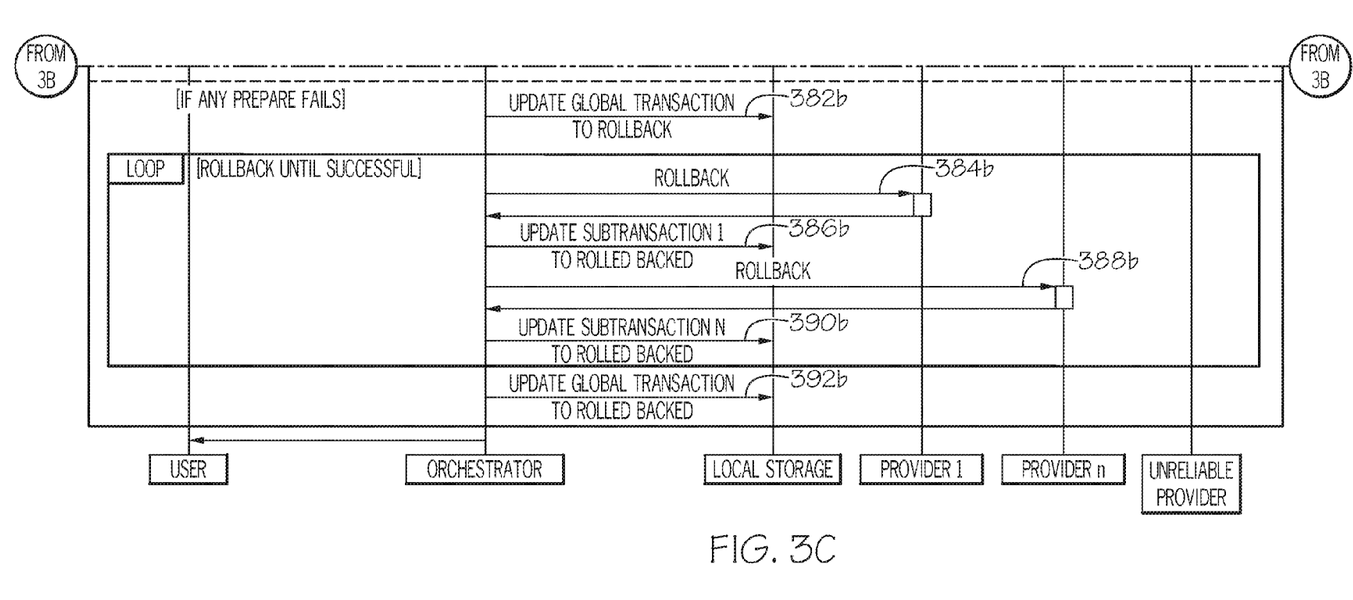

FIG. 3A-C is a sequence diagram showing a more detailed view of a method for executing a global transaction.

A system is described which comprises two or more target systems Provider 1, Provider N that support any reserve/commit protocol (also referred to as a prepare/commit protocol) over a potentially unreliable network(s), e.g. TCP based message protocols, wherein one target system Provider U does not support a reserve/commit protocol. According to embodiments of the present solution, it is possible to orchestrate one global transaction where atomicity is guaranteed in such a system.

The solution involves one process, e.g. a software process, referred to as an orchestrator, to save transaction states. The orchestrator may use persistent storage, for example, local storage within the orchestrator. This local persistent storage may comprise local files or a database.

For a global transaction involving multiple reliable branches the order of execution in the different phases is irrelevant. However, by sorting the different branches as presently disclosed one unreliable branch is allowed as well.

The solution will now be described with reference to FIG. 3A-C. In step 305 a user initiates a global transaction towards the Orchestrator involving sub transactions towards plural target systems from his Client Application such as a mobile phone, tablet, personal computer or other communication means. The message is sent with Hypert Text Transfer Protocol (HTTP), Short Message Service (SMS) or any other transport protocol.

A sorting of the involved sub transactions is done in step 307.

The Orchestrator registers the global transaction in step 310 by creating an entry for it in a Storage such as a database or on local file system as shown in step 315. The persistence of the registration enables the handling of eventual errors automatically. The Orchestrator further determines, based on the number of involved external systems that the global transaction shall consist of plural sub transactions. The registration of the global transaction involves also registering the associated sub transactions, e.g., one for each external system.

In step 320 the Orchestrator sends a Prepare message for a sub transaction to the first provider (Provider 1). The message contains a global Transaction Identity along with the prepare information. With the response of the Prepare message in step 325 the provider ensures that a following Commit with the same Transaction Identity will be successful. The Prepare message can be sent over unreliable networks such as Transmission Control Protocol (TCP) or User Datagram Protocol (UDP) networks.

The Orchestrator persists (i.e., stores, e.g., in a persistent memory) the Prepare for Provider 1 in step 330 by updating the registered sub transaction for Provider 1 to Prepared.

In steps 335-340 the Prepare procedure may now be performed for any other target systems, e.g. a Provider N, involved in the global transaction.

The Orchestrator persist the Prepare for Provider N by updating the registered sub transaction to Prepared in step 345.

In step 350 the Orchestrator updates the global transaction to state commit and persist the transaction to local storage.

The Orchestrator starts the Commit of the global transaction in step 355, by calling the Unreliable Provider. This call can be sent over any type of network (e.g. reliable or unreliable such as TCP/UDP). If there is no response in step 360 the orchestrator retries the call. If there is a negative response then the process is continued with step 382.

In step 365 the Orchestrator persists the sub transaction for the Unreliable Provider to local storage and updates the status for the sub transaction to the Unreliable Provider to Committed provided the transaction was successful in step 355 and then continues with step 370.

The Orchestrator calls Commit for Provider 1 in step 370. This request can be sent over any type of network (e.g. reliable or unreliable such as TCP/UDP). The message may be resent if there is no response or if the Commit is not completed.

In step 372 the Orchestrator persists the sub transaction for Provider 1 to Local Storage with the status of committed.

In step 374 a Commit message is sent similar to step 370 but for any other reliable provider and in step 378 the Orchestrator persists the result of step 374.

The Orchestrator changes status on the global transaction to committed (i.e. completed/finished) and persist the result to Local Storage in step 380.

If the sub transaction to the Unreliable Provider was unsuccessful in step 355, a rollback procedure is performed in steps 382*a*-392*a*:

Rollback scenario: The Orchestrator updates the global transaction to rollback and persists the result to local storage in step 382*a*.

Rollback scenario: The Orchestrator sends a rollback message to Provider 1 in step 384*a*. This message can be sent for any type of network and the message is resent if there is no response for the provider.

Rollback scenario: The Orchestrator updates the sub transaction for Provider 1 to rolled back in step 386*a*. The sub transaction is then persisted to local storage.

Rollback scenario: Step 388*a* corresponds to step 384*a* but for any other involved provider N.

Rollback scenario: Step 390*a* corresponds to step 386*a* but for any other involved provider.

Rollback scenario: The Orchestrator updates the global transaction to rolled back and persists the result to local storage in step 392*a*.

Similarly, in any prepare fails (e.g. in steps 320 or 335) a similar roll back procedure is executed in steps 382*b*-392*b*.

Figure 4:
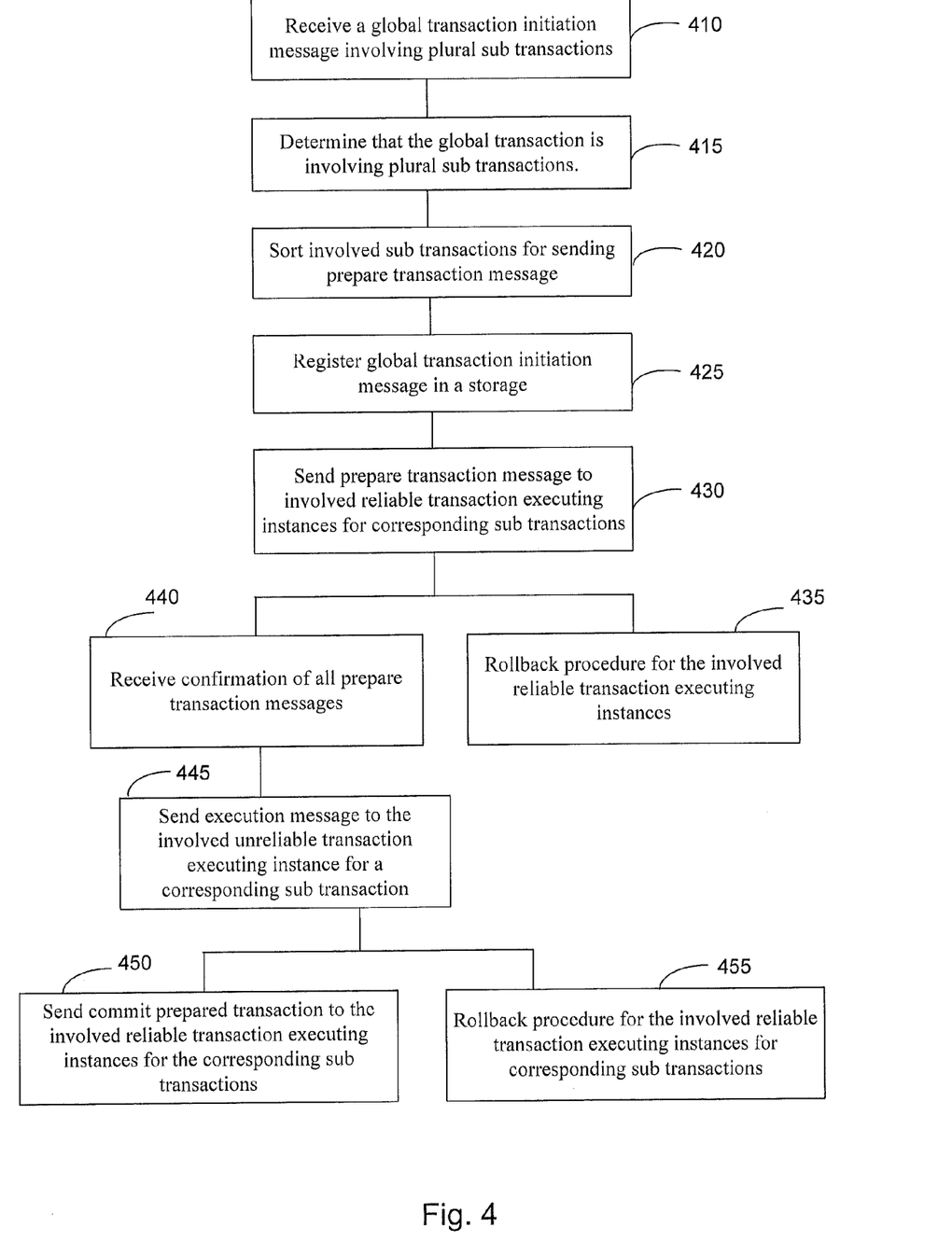
FIG. 4 is a flowchart showing a method for executing a global transaction performed by a transaction orchestrator node in a transaction execution system.

FIG. 4 is a flowchart showing a method for executing a global transaction performed by a transaction orchestrator node in a transaction execution system.

The transaction execution system is involving at least one reliable transaction executing instance supporting a reserve/commit protocol and one unreliable transaction executing instance that does not support a reserve/commit protocol.

In step 410 the transaction orchestrator node is receiving a global transaction initiation message involving plural sub transactions for execution by the involved corresponding transaction executing instances.

The transaction orchestrator node may when receiving, in a step 415, also be determining, based on the number of involved transaction executing instance, that the global transaction is involving plural sub transactions.

In step 420 the transaction orchestrator node may be sorting the involved sub transactions for sending the prepare transaction message to involved reliable transaction executing instances in step 415.

The transaction orchestrator node may be registering the global transaction initiation message in a storage in a step 425. This enables the handling of eventual errors automatically. The registering may comprise registering the associated sub transactions. Alternatively, the registering may comprise registering associated sub transactions, one for each transaction executing instance.

A prepare transaction message to involved reliable transaction executing instances for corresponding sub transactions is sent in step 430. The prepare transaction message may include a global transaction identity.

If the prepare transaction message is unsuccessful; the transaction orchestrator node may perform a rollback procedure for the involved reliable transaction executing instances for corresponding sub transactions in step 435.

Upon receiving confirmation of all prepare transaction messages in step 440, which may have been persisted in storage, the transaction orchestrator node is sending an execution message to the involved unreliable transaction executing instance for a corresponding sub transaction in step 445. Before sending the execution message the Orchestrator may update the global transaction to state commit and persist the transaction to local storage.

If the execution message is successful the transaction orchestrator node is sending a commit prepared transaction to the involved reliable transaction executing instances for the corresponding sub transactions in step 450.

If the execution message is unsuccessful, the transaction orchestrator node may perform a rollback procedure for the involved reliable transaction executing instances for corresponding sub transactions in step 455.

Figure 5:
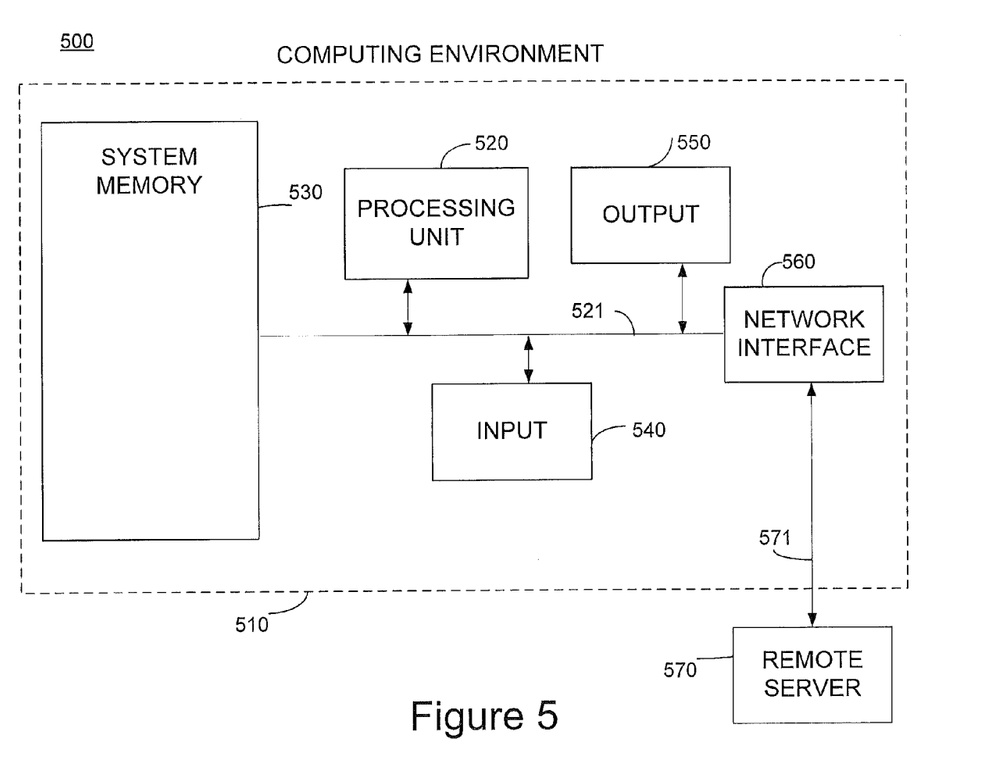
FIG. 5 is a block diagram showing an exemplary computing environment for implementing a transaction orchestrator node.
Figure 6:
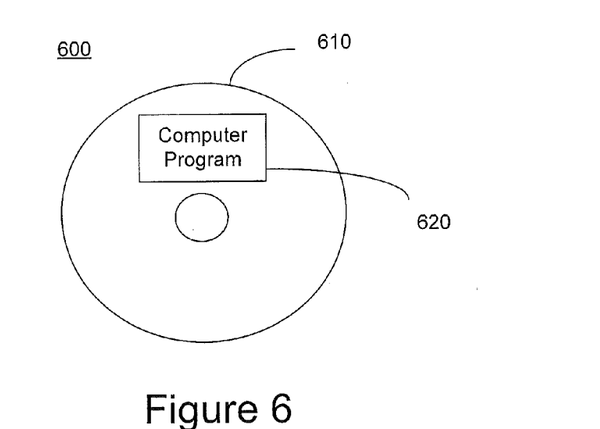
FIG. 6 is a block diagram showing an exemplary embodiment of a computer program and a computer program product.

FIG. 5 is a block diagram showing an exemplary computing environment for implementing a transaction orchestrator node for executing a global transaction in a transaction execution system involving at least one reliable transaction executing instance supporting a reserve/commit protocol and one unreliable transaction executing instance that does not support a reserve/commit protocol.

Although as made clear above, the computing system environment 500 is only one example of a suitable computing environment for an involved system node such as the transaction orchestrator node and is not intended to suggest any limitation as to the scope of use or functionality of the claimed subject matter. Further, the computing environment 500 is not intended to suggest any dependency or requirement relating to the claimed subject matter and any one or combination of components illustrated in the example operating environment 500.

The transaction orchestrator node includes a general purpose computing device in the form of a computer 510. Components of computer 510 can include, but are not limited to, a processing unit 520, a system memory 530, and a system bus 521 that couples various system components including the system memory to the processing unit 520. The system bus 521 can be any of several types of bus structures including a memory bus or memory controller, a peripheral bus, and a local bus using any of a variety of bus architectures.

Computer 510 can include a variety of transitory and non-transitory computer readable media. Computer readable media can be any available media that can be accessed by computer 510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules, program units or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media can embody computer readable instructions, data structures, program modules or other data in a modulated data signal such as a carrier wave or other transport mechanism and can include any suitable information delivery media.

The system memory 530 can include computer storage media in the form of volatile and/or nonvolatile memory such as read only memory (ROM) and/or random access memory (RAM). A basic input/output system (BIOS), containing the basic routines that help to transfer information between elements within computer 510, such as during start-up, can be stored in memory 530. Memory 530 can also contain data and/or program modules that are immediately accessible to and/or presently being operated on by processing unit 520. By way of non-limiting example, memory 530 can also include an operating system, application programs, other program modules, and program data.

The system memory 530 may contain instructions loaded in the memory and processable by the processing unit, or other circuitry, capable of adapting the computer for performing the steps of any of the involved system nodes such as the Client System, Orchestrator, Local Storage or Target Systems such as the Provider (1 . . . N) or the Unreliable Provider according to the disclosed solution.

As an example, the instructions may be adapting the computer 510 into a transaction orchestrator node for executing a global transaction in a transaction execution system involving at least one reliable transaction executing instance supporting a reserve/commit protocol and one unreliable transaction executing instance that does not support a reserve/commit protocol.

The instructions may, when executed by the processor, cause the node to receive a global transaction initiation message involving plural sub transactions for execution by the involved corresponding transaction executing instances.

The instructions may further cause the node to send a prepare transaction message to involved reliable transaction executing instances for corresponding sub transactions and upon receiving confirmation of all prepare transaction messages send an execution message to the involved unreliable transaction executing instance for a corresponding sub transaction.

The instructions may also cause the node to, if said execution message is successful, send a commit prepared transaction to the involved reliable transaction executing instances for the corresponding sub transactions.

The computer 510 can also include other removable/non-removable and volatile/nonvolatile computer storage media. For example, computer 510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 521 through a non-removable memory interface such as an interface, and a magnetic disk drive or optical disk drive can be connected to the system bus 521 by a removable memory interface, such as an interface.

A user can enter commands and information into the computer 510 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 520 through user input 540 and associated interface(s) that are coupled to the system bus 521, but can be connected by other interface and bus structures, such as a parallel port, game port or a universal serial bus (USB).

A graphics subsystem can also be connected to the system bus 521. In addition, a monitor or other type of display device can be connected to the system bus 521 through an interface, such as output interface 550, which can in turn communicate with video memory. In addition to a monitor, computers can also include other peripheral output devices, such as speakers and/or printing devices, which can also be connected through output interface 550.

The computer 510 can operate in a networked or distributed environment using logical connections to one or more other remote computers, such as remote server 570, which can in turn have media capabilities different from device 510. The remote server 570 can be a personal computer, a server, a router, a network PC, a peer device or other common network node, and/or any other remote media consumption or transmission device, and can include any or all of the elements described above relative to the computer 510. The logical connections depicted in FIG. 5 include a network 571, such as a local area network (LAN) or a wide area network (WAN), but can also include other networks/buses.

When used in a LAN networking environment, the computer 510 is connected to the LAN 571 through a network interface or adapter 560. When used in a WAN networking environment, the computer 510 can include a communications component, such as a modem, or other means for establishing communications over a WAN, such as the Internet. A communications component, such as a modem, which can be internal or external, can be connected to the system bus 521 through the user input interface at input 540 and/or other appropriate mechanism.

In a networked environment, program modules depicted relative to the computer 510, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present solution. All such variations and modifications are intended to be included herein within the scope of the present solution.

Further, non-limiting, example embodiments include: (i) A method for performing a distributed global transaction in a data communication network having one or more unreliable service providers, the method comprising reserving a first sub-transaction of the distributed global transaction with a first target in the data communication network; attempting to commit a second sub-transaction of the distributed global transaction with a second target in the data communication network, the second target being an unreliable target; and if the second sub-transaction is successfully committed, committing the first reserved sub-transaction, otherwise, rolling back the first reserved sub-transaction without committing the first reserved sub-transaction, whereby atomicity is guaranteed for the distributed global transaction. (ii) A system for performing distributed transactions in a data communication network having one or more unreliable service providers, the system comprising: a processor; a memory containing instructions that, when executed by the processor, cause the apparatus to implement the method of the above example embodiment (i).

The invention claimed is:

1. A method for executing a global transaction performed by a transaction orchestrator node in a transaction execution system, the global transaction comprising transaction executing instances, the transaction executing instances comprising at least one reliable transaction executing instance supporting a reserve/commit protocol and one unreliable transaction executing instance that does not support a reserve/commit protocol, the transaction orchestrator node performing operations comprising:
receiving a global transaction initiation message comprising a plurality of sub transactions for execution by corresponding ones of the transaction executing instances;
sorting the plurality of the sub transactions for sending at least one prepare transaction message associated with the at least one reliable transaction executing instance;
sending the at least one prepare transaction message to corresponding ones of the at least one reliable transaction executing instance for corresponding ones of the plurality of sub transactions associated with the at least one reliable transaction executing instance;
upon receiving confirmation of receipt of all of the at least one prepare transaction message, sending an execution message to the one unreliable transaction executing instance for a corresponding sub transaction associated with the one unreliable transaction executing instance; and
if said execution message is successful, sending a commit prepared transaction to the at least one reliable transaction executing instance for the corresponding sub transactions.

2. A method according to claim 1 wherein, after the receiving the global transaction initiation message, performing operations comprising:
registering the global transaction initiation message in a storage.

3. A method according to claim 2 wherein the transaction orchestrator node further performs operations comprising:
registering associated sub transactions.

4. A method according to claim 2 wherein the registering further comprises registering an associated sub transaction of the plurality of sub transaction for each transaction executing instance of the transaction executing instances.

5. A method according to claim 1 wherein the receiving the global transaction initiation further comprises:
determining, based on a number of transaction executing instances, that the global transaction comprises a plurality of sub transactions.

6. A method according to claim 1 wherein the at least one prepare transaction message comprises a global transaction identity.

7. A method according to claim 1 wherein, if said execution message is unsuccessful, performing a rollback procedure for the at least one reliable transaction executing instance for corresponding sub transactions.

8. A method according to claim 1, the operations further comprising:
if the at least one of the prepare transaction messages is unsuccessful, performing a rollback procedure for the reliable transaction executing instances for corresponding ones of the sub transactions.

9. A transaction orchestrator node for executing a global transaction in a transaction execution system comprising at least one reliable transaction executing instance supporting a reserve/commit protocol and one unreliable transaction executing instance that does not support a reserve/commit protocol, the node comprising:
- a processor;
- a memory containing instructions that, when executed by the processor, cause the node to perform operations comprising:
  - receiving a global transaction initiation message comprising a plurality of sub transactions for execution by corresponding ones of the transaction executing instances;
  - sorting the plurality of the sub transactions for sending at least one prepare transaction message associated with the at least one reliable transaction executing instance;
  - sending the at least one prepare transaction message to corresponding ones of the at least one reliable transaction executing instance for corresponding ones of the plurality of sub transactions associated with the at least one reliable transaction executing instance;
  - upon receiving confirmation of receipt of all the at least one prepare transaction message, sending an execution message to the one unreliable transaction executing instance for a corresponding sub transaction associated with the one unreliable transaction executing instance; and
  - if said execution message is successful sending a commit prepared transaction to the at least one reliable transaction executing instance for the corresponding sub transactions.

10. A transaction orchestrator node according to claim 9, wherein the memory is further containing instructions that, when executed by the processor, cause the transaction orchestrator node to perform operations comprising:
  - registering the global transaction initiation message in a storage.

11. A transaction orchestrator node according to claim 10, wherein the memory is further containing instructions that, when executed by the processor, cause the transaction orchestrator node to further perform operations comprising:
  - registering the associated sub transactions.

12. A transaction orchestrator node according to claim 10, wherein the memory is further containing instructions that, when executed by the processor, cause the transaction orchestrator node to perform operations comprising:
  - registering an associated sub transaction of the plurality of sub transactions for each transaction executing instance of the transaction executing instances.

13. A transaction orchestrator node according to claim 9, wherein the memory is further containing instructions that, when executed by the processor, cause the transaction orchestrator node to performs operations comprising:
  - determining, based on a number of transaction executing instances, that the global transaction comprises a plurality of sub transactions.

14. A transaction orchestrator node according to claim 9, wherein the memory is further containing instructions that, when executed by the processor, cause the transaction orchestrator node to include a global transaction identity in the at least one prepare transaction message.

15. A transaction orchestrator node according to claim 9, wherein the memory is further containing instructions that, when executed by the processor, cause the transaction orchestrator node to, if said execution message is unsuccessful, perform a rollback procedure for the at least one reliable transaction executing instance for corresponding sub transactions.

16. A transaction orchestrator node according to claim 9, wherein the memory is further containing instructions that, when executed by the processor, cause the transaction orchestrator node to, if the at least one of the prepare transaction message is unsuccessful, perform a rollback procedure for the reliable transaction executing instances for corresponding ones of the sub transactions.

17. A transaction orchestrator node according to claim 9 wherein the storage is a persistent storage.

18. A transaction orchestrator node according to claim 17 wherein the persistent storage conforms to principles which guarantee that database transactions are processed reliably, such as atomicity, consistency, isolation, or durability principles.

19. A computer program product, comprising a non-transitory computer readable medium and a computer program stored on the computer readable medium, the computer program comprising computer readable code means, which when run in a computer being configured as a transaction orchestrator node for executing a global transaction in a transaction execution system comprising transaction executing instances, the transaction executing instances comprising at least one reliable transaction executing instance supporting a reserve/commit protocol and one unreliable transaction executing instance that does not support a reserve/commit protocol, causes the computer to perform operations comprising:
  - receiving a global transaction initiation message comprising a plurality of sub transactions for execution by corresponding ones of the transaction executing instances;
  - sorting the plurality of the sub transactions for sending at least one prepare transaction message associated with the at least one reliable transaction executing instance;
  - sending the at least one prepare transaction message to corresponding ones of the at least one reliable transaction executing instance for corresponding ones of the plurality of sub transactions associated with the at least one reliable transaction executing instance;
  - upon receiving confirmation of receipt of all of the at least one prepare transaction message, sending an execution message to the one unreliable transaction executing instance for a corresponding sub transaction associated with the one unreliable transaction executing instance; and
  - if said execution message is successful, sending a commit prepared transaction to the at least one reliable transaction executing instance for the corresponding sub transactions.

* * * * *